United States Patent
Nikles et al.

(10) Patent No.: US 8,204,264 B2
(45) Date of Patent: Jun. 19, 2012

(54) FACEPLATE FOR HEARING DEVICES AND METHOD FOR PRODUCING A FACEPLATE

(75) Inventors: Peter Nikles, Erlangen (DE); Erika Radick, Nürnberg (DE); Benjamin Schmidt, Nürnberg (DE); Christian Schmitt, Grossenseebach (DE); Erwin Singer, Eckental (DE); Cornelia Wiedenbrüg, Spardorf (DE)

(73) Assignee: Siemens Medical Instruments Pte. Ltd., Singapore (SG)

( * ) Notice: Subject to any disclaimer, the term of this patent is extended or adjusted under 35 U.S.C. 154(b) by 876 days.

(21) Appl. No.: 12/288,576

(22) Filed: Oct. 21, 2008

(65) Prior Publication Data

US 2009/0123012 A1     May 14, 2009

(30) Foreign Application Priority Data

Nov. 9, 2007 (DE) .......... 10 2007 053 539

(51) Int. Cl.
*H04R 25/00* (2006.01)
(52) U.S. Cl. ....... 381/322; 381/324; 381/328; 29/896.2; 29/896.21
(58) Field of Classification Search .................. 381/312, 381/322, 324, 328; 29/896.2, 896.21
See application file for complete search history.

(56) References Cited

U.S. PATENT DOCUMENTS

| | | | |
|---|---|---|---|
| 5,014,037 A | 5/1991 | McDonald | |
| 6,879,697 B2 | 4/2005 | Tøpholm | |
| 7,869,614 B2 * | 1/2011 | Gabathuler | 381/329 |
| 2003/0123687 A1 | 7/2003 | Petrick et al. | |
| 2007/0286442 A1 * | 12/2007 | Hessel et al. | 381/322 |

FOREIGN PATENT DOCUMENTS

| | | |
|---|---|---|
| DE | 41 21 311 C1 | 8/1992 |
| DE | 29602921 U1 | 6/1996 |
| EP | 0684749 A2 | 11/1995 |
| EP | 1246506 A1 | 10/2002 |
| EP | 1641316 A2 | 3/2006 |
| WO | 9203894 A1 | 3/1992 |
| WO | 9927755 A1 | 6/1999 |

* cited by examiner

*Primary Examiner* — Steven Loke
*Assistant Examiner* — Cuong Nguyen

(57) ABSTRACT

A faceplate of a hearing device housing with a component fitted in an opening of the faceplate and an associated method are provided. The faceplate is formed from a first material. When a predefinable distance between the support surface of the components in the opening and the surface facing away from the exterior of the faceplate is not reached, a second material is applied below the support surface to the surface of the faceplate such that the predefinable distance is produced. As a result, even with fitted components, for instance the volume controller or program selection switch, the mechanical stability of the faceplate is ensured.

9 Claims, 2 Drawing Sheets

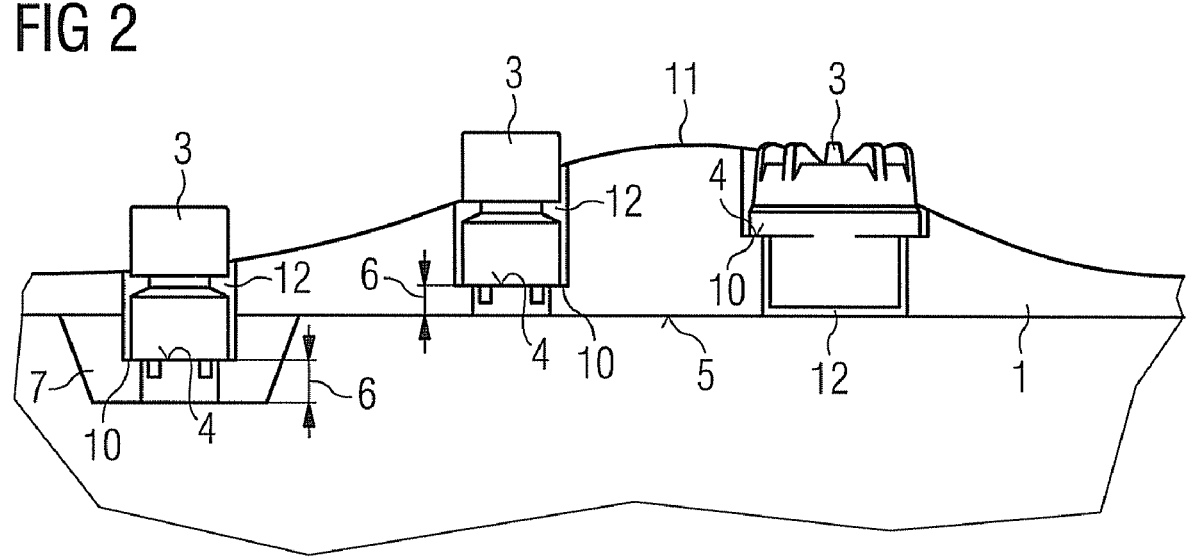
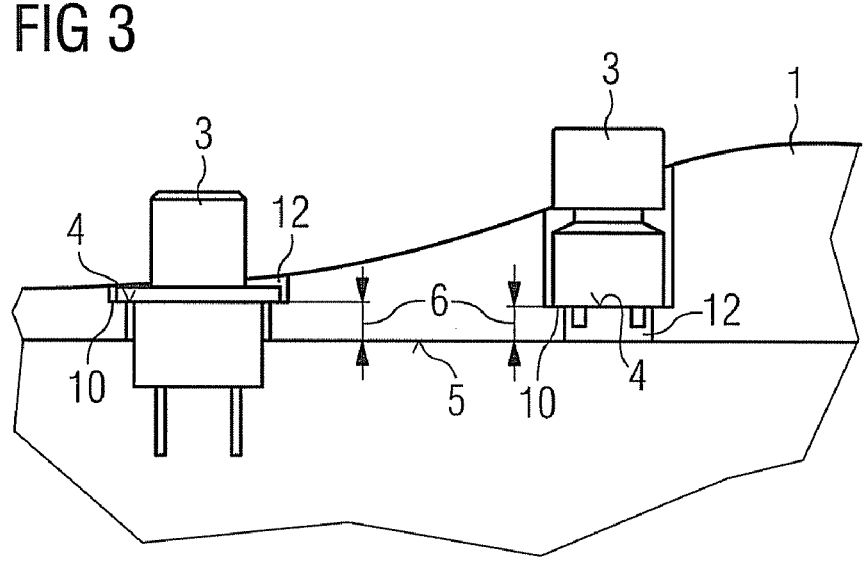

FACEPLATE FOR HEARING DEVICES AND METHOD FOR PRODUCING A FACEPLATE

CROSS REFERENCE TO RELATED APPLICATIONS

This application claims priority of German application No. 10 2007 053 539.4 DE filed Nov. 9, 2007, which is incorporated by reference herein in its entirety.

FIELD OF INVENTION

The invention relates to a faceplate for hearing device housings, a method for producing a faceplate and computer program products.

BACKGROUND OF INVENTION

With in-the-ear hearing devices, components, like for instance the microphone, amplifier or loudspeaker, are integrated in a housing shell, which is molded so as to correspond to the auditory canal of the hearing device wearer. The front of the housing shell is completed with a faceplate. The size and shape of the faceplate is variable as a result of the housing shell which is molded specifically to the hearing device wearer.

Control components, like the program switch and volume controller are integrated in the faceplate. The control components must be accessible for a hearing device wearer both from the outside and also inwards toward the components of the housing shell.

Patent application DE 41 21 311 C1 specifies a hearing device which can be worn in the ear and a method for the production thereof. A housing is sealed by a faceplate, which has a penetrating assembly opening.

To ensure a secure fit, the control components are integrated in the faceplate such that after fitting, a minimum material thickness of the faceplate below the support surface of the control components remains as counter pressure supports. The control components can thus only be integrated in certain regions of the faceplate. Alternatively, a control component with a larger diameter but smaller installation depth can be selected. This nevertheless occupies a larger surface of the faceplate. Therefore, the faceplate must potentially be embodied to be larger.

U.S. Pat. No. 6,879,697 B2 specifies the production of a hearing device housing, consisting of a faceplate and a housing shell, which are individually adjusted to the shape of the auditory canal of a user. The production method contains at least one automatic step which is based on a CAD/CAM model of a hearing device housing.

SUMMARY OF INVENTION

The object of the invention is to specify a faceplate and an associated production method, which allows a simple and secure positioning of control components which are adjusted to the individuality of the housing shell.

In accordance with the invention, the set object is achieved with the arrangement and the method of the independent claims, by a second constituent being applied below the support surface on the surface of the faceplate such that the predefinable minimum material thickness can be reproduced if a predefinable minimal thickness between the support surface of a component in an opening of a faceplate and the surface facing away from the exterior of the faceplate is not reached.

This is advantageous in that the mechanical stability of the faceplate remains in spite of components being fitted.

In one development, the first constituent, from which the faceplate is formed, and the second constituent are identical.

This is advantageous in that the production process is simplified.

In a further embodiment, the first and second constituent are applied by means of a stereolithography process.

As a result, a faceplate adjusted to the auditory canal of the hearing device wearer can be produced in a very simple fashion.

A further object of the invention consists in specifying a computer program product.

According to the invention, the computer program product includes a computer program, which has software means for implementing the afore-cited method, if the computer program is executed in an automation system.

This is advantageous in that the method can proceed fully automatically.

A further object of the invention consists in specifying a further method for fitting components in a simple and secure fashion.

This is achieved by the independent claims, by a faceplate of a hearing device housing being produced with at least one component which can be fitted in an opening of the faceplate, having the following steps: assembling the faceplate made from a first constituent, determining the size and position of the components such that when the components are fitted, a predefinable distance between the support surface of the components in the opening and the surface facing away from the exterior of the faceplate is reached, selecting the corresponding components, drilling an opening which corresponds to one of the selected components into the faceplate in the determined position and fitting the components in the opening.

This is advantageous in that the mechanical stability of the faceplate is still ensured even after components have been fitted.

In one embodiment, the faceplate is assembled using an injection molding method.

The simple and cost-effective production of a faceplate is advantageous here.

A further object of the invention consists in specifying a computer program product for the aforesaid method.

This is achieved by the independent claims, by a computer program product with a computer program having software means for implementing a method as claimed in of the independent claims, if the computer program is executed in an automation system.

As a result, the positioning and selection of components is automated and thus simplified.

BRIEF DESCRIPTION OF THE DRAWINGS

Further details of the invention are apparent from the descriptions which follow of several exemplary embodiments, with reference to schematic drawings, in which;

FIG. 2: shows a sectional view of a faceplate with control components,

FIG. 3: shows a sectional view of a further faceplate with control components

DETAILED DESCRIPTION OF INVENTION

Figure 1:
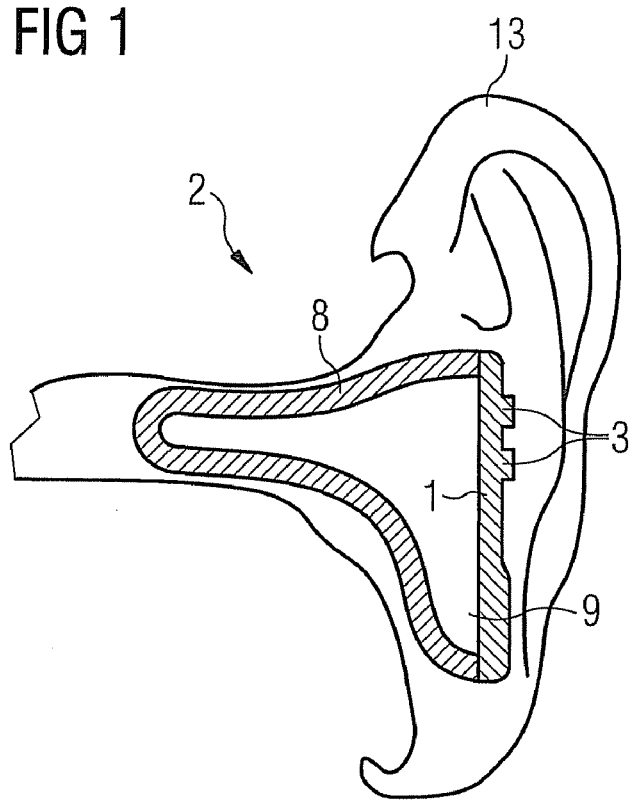
FIG. 1: shows a sectional view of an in-the-ear hearing device.

FIG. 1 shows a sectional view of a hearing device housing 2 of an in-the-ear hearing device, which is inserted into the outer auditory canal of the ear 13 of a hearing device wearer. The hearing device housing 2 includes a housing shell 8 and a faceplate 1 connected thereto, which is arranged so as to open the concha of the ear 13. A hearing device electronic system (not shown) is integrated in the cavity 9 formed by the housing shell 8 and the faceplate 1. The housing shell 8 and faceplate 1 are made of plastic for instance and are glued to one another. Components 3 which are shown in more detail in FIGS. 2 and 3 are integrated in the faceplate 1. These components 3 are generally electrical or electronic components, for instance volume controllers or program switches, for operating the hearing device.

FIG. 2 shows a cutout of a cross-section through an inventive faceplate 1. The faceplate 1 is produced from a first material by means of stereolithography methods for instance. In this process, the openings 12 for the components 3, for instance the volume controller or the program switch, are already provided with the material structure. The openings 12 have lugs 10, upon which the components 3 with their support surfaces 4 come to rest. To ensure that the faceplate 1 offers sufficient mechanical resistance during actuation, for instance pressing, of the components 3, the distance 6 between the support surface 4 and/or lug 10 and the surface 5, which faces the exterior 11 of the faceplate 1, must reach a minimum value. On the other hand, the components 3 could be pressed through the faceplate 1 into the interior of the hearing device housing. A typical value for the minimal distance is 0.3 mm for instance. The size of the value is dependent on the first material used.

In the case of the components 3 shown to the far left, this minimal distance 6 would not be reached, so that in accordance with the invention, a second material 7, which can also be identical to the first material, is applied to the surface 5 such that the required distance 6 is reproduced. The mechanical stability is thus proven again. The application of the second material 7 preferably takes place during the same process as the fitting of the faceplate 1.

As the openings 12 already appear during the assembly of the faceplate 1 and are not drilled afterwards, the position and layer thickness of the second material 7 to be applied must already be determined before the start of the assembly of the faceplate 1. This takes place for instance by means of a computer-controlled calculation method.

FIG. 3 shows a cutout of a sectional image through a faceplate 1 which was produced in an injection molding method for instance. While components 3 are fitted into the openings 12, a minimal distance 6 between the surface 5 and the support surface 4 must also be reached here so as not to jeopardize the mechanical stability of the faceplate 1. The components 3 lie with their support surfaces 4 on lugs 10 in the openings 12.

In the embodiment shown in FIG. 3, the openings 12 are drilled once assembly of the faceplate 1 has finished. In this case, another position on the faceplate has to be found if the minimal distance 6 is potentially not reached, or another component 3, which has a smaller installation depth but a larger diameter, must be selected. In order to ensure the constant quality of this search for a suitable component 3 and its position, this method is implemented in accordance with the invention by an automatic process. To this end, a computer program runs on an automation system, which is linked for instance to a drilling fixture for drilling the openings 12. The automation system predefines the diameter and the position of the openings 12 to the boring fixture.

Figure 4:
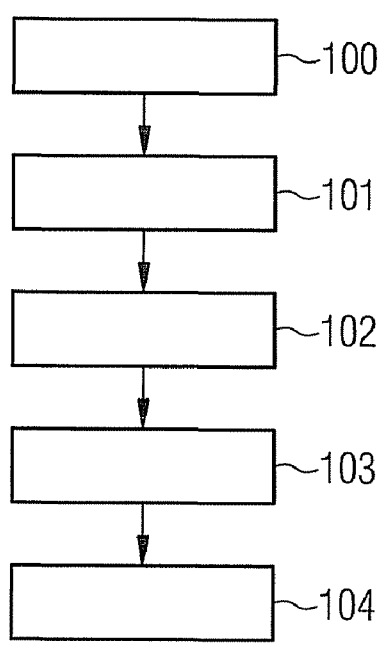
FIG. 4: shows a flow chart for selecting and positioning control components.

FIG. 4 shows a schematic representation of the procedure involved in producing a faceplate 1 of a hearing device housing 2 with at least one component 3 which can be fitted in an opening 12 of the faceplate 1, having the steps:

assembling 100 the faceplate from a first constituent,
determining 101 the size and position of the components 3 such that when the components 3 are fitted, a predefinable distance 6 between the support surface 4 of the components 3 in the opening 12 and the surface 5 facing away from the exterior of the faceplate 1 is not reached,
selecting 102 the components according to step 101,
drilling 103 an opening 12 which corresponds to the selected components 3 into the faceplate 1 in the position determined according to step 101 and
fitting 104 the components 3 into the opening 12.

For automation purposes, the different steps of the production method can be implemented in a computer program product and executed on an automation system.

The invention claimed is:

1. A faceplate of a hearing device housing, comprising:
an opening in which to fit a component; and
a surface facing away from an exterior of the faceplate,
wherein the faceplate is formed from a first material, and
wherein when a predefinable distance between a support surface of the component in the opening and the facing-away surface is not reached, a second material is applied below the support surface to the surface of the facing-away faceplate in order to produce the predefinable distance, wherein a lug surface of the second material at the predefined distance from the facing-away surface, wherein the lug surface stops the component from being pressed inward through the faceplate.

2. The faceplate as claimed in claim 1, wherein the first and second material are identical.

3. A method for producing a faceplate of a hearing device housing, comprising:
assembling the faceplate with an integrated opening made of a first material;
applying a second material onto a surface of the faceplate facing away from an exterior of the faceplate and below a support surface of a component to be fitted in the opening, the second material applied when a predefinable distance between the support surface of the component when fitted in the opening and the facing-away surface is not reached, the second material applied until the predefinable distance met or exceeded; and
fitting the component, wherein a lug surface of the second material at the predefined distance from the facing-away surface, wherein the lug surface stops the component from being pressed inward through the faceplate.

4. The method as claimed in claim 3, wherein the applying a second material includes a stereolithography process.

5. The method as claimed in claim 4, wherein the assembling includes a stereolithography process.

6. The method as claimed in claim 3, wherein the assembling includes a stereolithography process.

7. A method for producing a faceplate of a hearing device housing, comprising:
assembling the faceplate from a first material;
determining a size and a position of a component to be fitted in an opening of the faceplate, such that when the component is fitted, a predefinable distance between a support surface of the component in the opening and a surface facing away from an exterior of the faceplate is not reached;
selecting the component according to determining the size and position;
applying a second material onto the facing-away surface until the predefinable distance is met or exceeded; and drilling the opening corresponding to the selected component into the faceplate according to the determined size and position; and fitting the component into the opening, wherein a lug surface of the second material at the predefined distance from the facing-away surface, wherein the lug surface stops the component from being pressed inward through the faceplate.

8. The faceplate as claimed in claim 7, wherein the support surface of the component rests on the lug surface.

9. The faceplate as claimed in claim 3, wherein the support surface of the component rests on the lug surface.

\* \* \* \* \*